(12) United States Patent
Almaraz et al.

(10) Patent No.: US 12,012,790 B2
(45) Date of Patent: Jun. 18, 2024

(54) LATCH ASSEMBLY

(71) Applicant: Rohr, Inc., Chula Vista, CA (US)

(72) Inventors: Hugo Almaraz, San Juan Capistrano, CA (US); Braskel Phillips, San Diego, CA (US)

(73) Assignee: Rohr, Inc., Chula Vista, CA (US)

( * ) Notice: Subject to any disclaimer, the term of this patent is extended or adjusted under 35 U.S.C. 154(b) by 0 days.

(21) Appl. No.: 17/902,559

(22) Filed: Sep. 2, 2022

(65) Prior Publication Data

US 2024/0076918 A1    Mar. 7, 2024

(51) Int. Cl.
*E05C 19/14*    (2006.01)
*B64D 29/06*    (2006.01)

(52) U.S. Cl.
CPC ............ *E05C 19/145* (2013.01); *B64D 29/06* (2013.01)

(58) Field of Classification Search
CPC ......... B64D 29/06; B64D 29/08; E05C 19/14; E05C 19/145
See application file for complete search history.

(56) References Cited

U.S. PATENT DOCUMENTS

| | | | |
|---|---|---|---|
| 2,703,431 A * | 3/1955 | Tatom | E05C 19/145 292/DIG. 31 |
| 2,712,955 A | 7/1955 | Andrews | |
| 2,750,217 A | 6/1956 | Landholt | |
| 2,894,777 A | 7/1959 | Hogan | |
| 2,904,141 A | 9/1959 | Henrichs | |
| 3,070,395 A | 12/1962 | Morrison | |
| 4,053,177 A | 10/1977 | Stammreich | |
| 4,183,564 A | 1/1980 | Poe | |
| 4,318,557 A | 3/1982 | Bourne | |
| 4,602,812 A | 7/1986 | Bourne | |
| 4,743,052 A | 5/1988 | Stammreich | |
| 4,768,815 A | 9/1988 | Harmon | |
| 5,152,559 A * | 10/1992 | Henrichs | B64D 29/06 292/DIG. 31 |
| 5,620,212 A | 4/1997 | Bourne | |
| 5,915,765 A * | 6/1999 | Sternberger | B64D 29/06 24/270 |

(Continued)

FOREIGN PATENT DOCUMENTS

EP    0431769 B1    12/1993

OTHER PUBLICATIONS

EP Search Report for EP Patent Application No. 23195241.7 dated Dec. 21, 2023.

*Primary Examiner* — Andrew H Nguyen
(74) *Attorney, Agent, or Firm* — Getz Balich LLC

(57) ABSTRACT

A latch includes a handle, a hook, a first link, and a second link. The hook is rotatably mounted to the handle at a first rotational axis. The hook includes a hook body. The hook body includes a first lateral portion and a second lateral portion. The first lateral portion is laterally spaced from the second lateral portion. The first link is laterally between the first lateral portion and the second lateral portion. The first link is rotatably mounted to the first lateral portion and the second lateral portion at the first rotational axis. The second link is laterally between the first lateral portion and the second lateral portion. The second link is rotatably mounted to the first link at a second rotational axis. The second link is configured for translation relative to the first lateral portion and the second lateral portion.

19 Claims, 8 Drawing Sheets

(56) References Cited

U.S. PATENT DOCUMENTS

| | | |
|---|---|---|
| 5,984,382 A | 11/1999 | Bourne |
| 6,279,971 B1 | 8/2001 | Dessenberger, Jr. |
| 7,066,501 B2 | 6/2006 | Meineke |
| 9,004,548 B2 | 4/2015 | Joret |
| 11,102,046 B2 | 8/2021 | Kim |
| 11,193,305 B2 | 12/2021 | Helsley |
| 2022/0120115 A1 | 4/2022 | Helsley |
| 2022/0195765 A1 | 6/2022 | McMahan |

* cited by examiner

LATCH ASSEMBLY

BACKGROUND

1. Technical Field

This disclosure relates generally to cowl doors for a gas turbine engine nacelle, and more particularly to latch assemblies for securing cowl doors.

2. Background Information

Gas turbine engines, such as those used for aircraft, may include a nacelle configured to house the gas turbine engine and other auxiliary systems. The nacelle may include one or more cowl sections (e.g., a fan cowl, a thrust reverser cowl, etc.). The cowl sections may include one or more movable cowl doors configured to provide access to internal gas turbine engine components. The cowl doors may be secured during flight by one or more latch assemblies. Various types and configurations of latch assemblies are known in the art. While these known latch assemblies have various advantages, there is still room in the art for improvement. There is a need in the art, therefore, for an improved latch assembly.

SUMMARY

It should be understood that any or all of the features or embodiments described herein can be used or combined in any combination with each and every other feature or embodiment described herein unless expressly noted otherwise.

According to an aspect of the present disclosure, a latch includes a handle, a hook, a first link, and a second link. The hook is rotatably mounted to the handle at a first rotational axis. The hook includes a hook body. The hook body includes a first lateral portion and a second lateral portion. The first lateral portion is laterally spaced from the second lateral portion. The first link is laterally between the first lateral portion and the second lateral portion. The first link is rotatably mounted to the first lateral portion and the second lateral portion at the first rotational axis. The second link is laterally between the first lateral portion and the second lateral portion. The second link is rotatably mounted to the first link at a second rotational axis. The second link is configured for translation relative to the first lateral portion and the second lateral portion.

In any of the aspects or embodiments described above and herein, the first lateral portion may include a first slot, the second lateral portion may include a second slot, and the second link may be positioned within the first slot and the second slot.

In any of the aspects or embodiments described above and herein, the first slot may extend longitudinally within the first lateral portion and the second slot may extend longitudinally within the second lateral portion.

In any of the aspects or embodiments described above and herein, the second link may include a cylindrical body. The cylindrical body may be positioned within the first slot and the second slot.

In any of the aspects or embodiments described above and herein, the hook may be configured for rotation about the cylindrical body.

In any of the aspects or embodiments described above and herein, the first link may be rotatably mounted to the handle at a third rotational axis.

In any of the aspects or embodiments described above and herein, the handle may form a first handle slot and a second handle slot. The first link may be rotatably mounted to the handle within the first handle slot and the second handle slot.

In any of the aspects or embodiments described above and herein, the hook body may extend from a first longitudinal end to a second longitudinal end, the hook body may further include a hook portion at the first longitudinal end, and the first lateral portion and the second lateral portion may extend from the hook portion to the second longitudinal end.

In any of the aspects or embodiments described above and herein, the first rotational axis may be positioned at the second longitudinal end.

In any of the aspects or embodiments described above and herein, the handle may include a latch release member. The latch release member may be positionable in a latched position and an unlatched position. The latch release member may be configured to contact the first lateral portion and the second lateral portion in the latched position.

According to another aspect of the present disclosure, a latch assembly includes a hook, a first link, and a second link. The hook is rotatable about a first rotational axis. The hook includes a hook body. The hook body includes a first lateral portion and a second lateral portion. The first lateral portion is laterally spaced from the second lateral portion. The first link is laterally between the first lateral portion and the second lateral portion. The first link is rotatably mounted to the first lateral portion and the second lateral portion at the first rotational axis. The second link is laterally between the first lateral portion and the second lateral portion. The second link is rotatably mounted to the first link at a second rotational axis. The second link includes a cylindrical body. The cylindrical body extends laterally through the first lateral portion and the second lateral portion.

In any of the aspects or embodiments described above and herein, the first lateral portion and the second lateral portion may be configured to translate relative to the cylindrical body.

In any of the aspects or embodiments described above and herein, the hook body may extend from a first longitudinal end to a second longitudinal end and the hook body may further include a hook portion at the first longitudinal end. The first lateral portion and the second lateral portion may extend from the hook portion to the second longitudinal end.

In any of the aspects or embodiments described above and herein, the second link may be positioned longitudinally between the first link and the hook body.

In any of the aspects or embodiments described above and herein, the first rotational axis may be positioned at the second longitudinal end.

In any of the aspects or embodiments described above and herein, the hook may be configured for rotation about the cylindrical body.

According to another aspect of the present disclosure, a latch assembly includes a first latch portion and a second latch portion. The first latch portion includes a keeper. The second latch portion includes a handle, a hook, a first link, and a second link. The hook is rotatably mounted to the handle at a first rotational axis. The hook includes a hook body. The hook body includes a hook portion, a first lateral portion, and a second lateral portion. The hook portion is configured to selectively engage the keeper. The first lateral portion and the second lateral portion extend longitudinally from the hook portion. The first lateral portion is laterally spaced from the second lateral portion. The first link is laterally between the first lateral portion and the second lateral portion. The first link is rotatably mounted to the first lateral portion and the second lateral portion at the first rotational axis. The second link is laterally between the first lateral portion and the second lateral portion. The second link is rotatably mounted to the first link. The second link is further rotatably mounted to the first lateral portion and the second lateral portion.

In any of the aspects or embodiments described above and herein, the latch assembly may further include a first cowl door and a second cowl door. The first cowl door may include the first latch portion and the second cowl door may include the second latch portion.

In any of the aspects or embodiments described above and herein, the hook body may extend from a first longitudinal end to a second longitudinal end. The hook portion may be at the first longitudinal end. The first lateral portion and the second lateral portion may extend from the hook portion to the second longitudinal end.

In any of the aspects or embodiments described above and herein, the first link and the second link may be longitudinally between the hook portion and the second longitudinal end.

The present disclosure, and all its aspects, embodiments and advantages associated therewith will become more readily apparent in view of the detailed description provided below, including the accompanying drawings.

DETAILED DESCRIPTION

Figure 1:
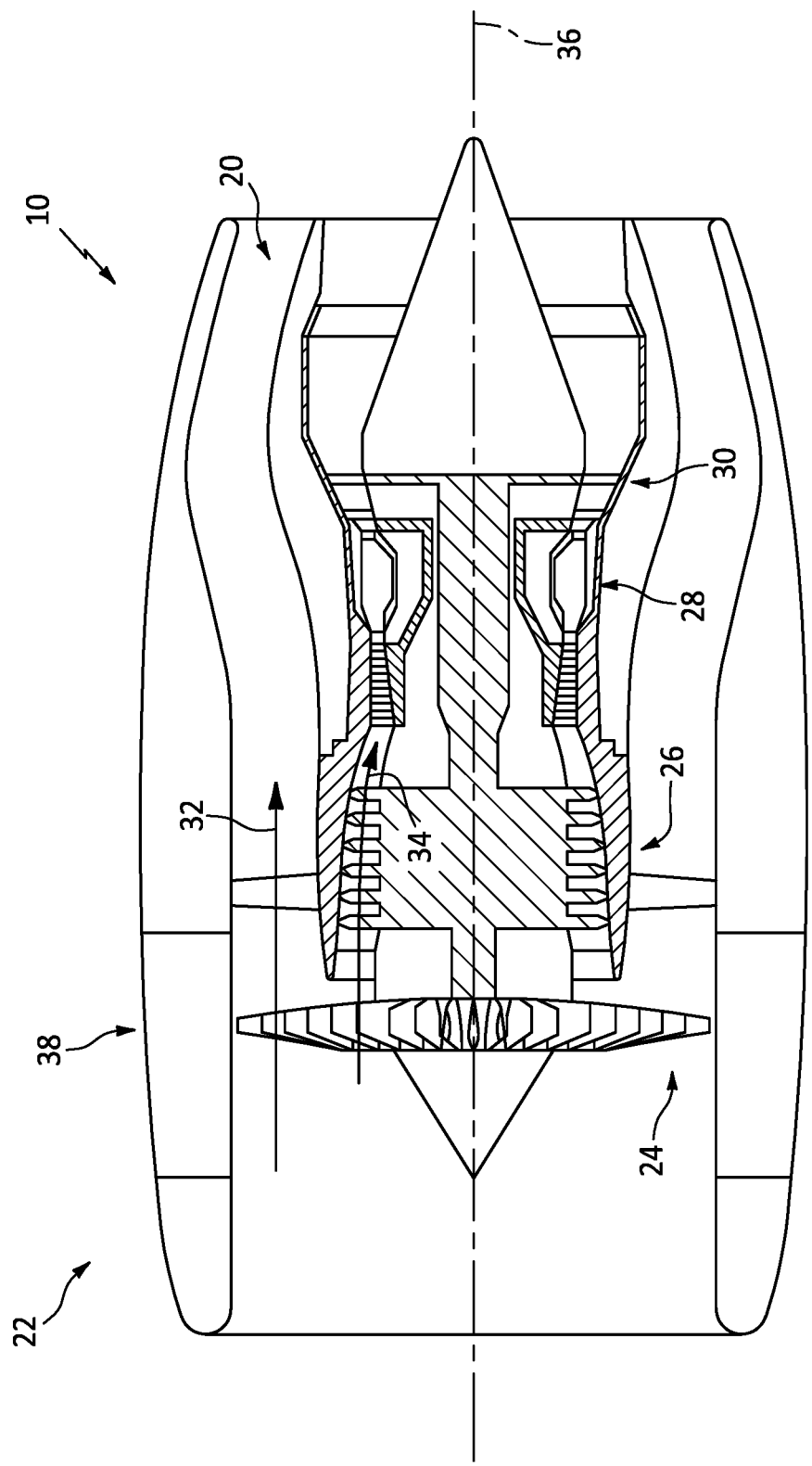
FIG. 1 illustrates a schematic cutaway view of an aircraft propulsion assembly, in accordance with one or more embodiments of the present disclosure.
Figure 2:
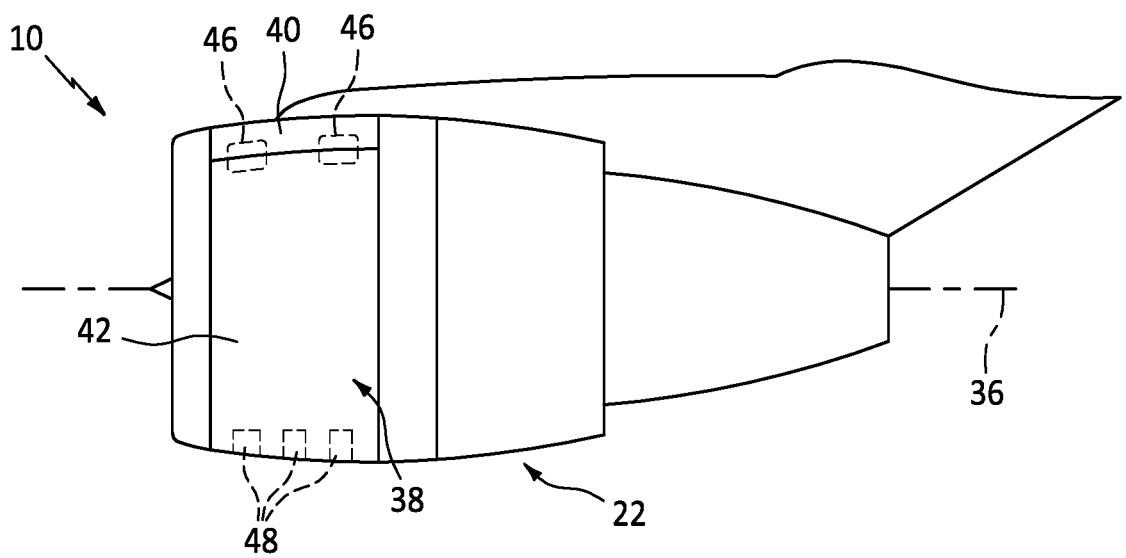
FIG. 2 illustrates a side view of an aircraft propulsion assembly, in accordance with one or more embodiments of the present disclosure.
Figure 3:
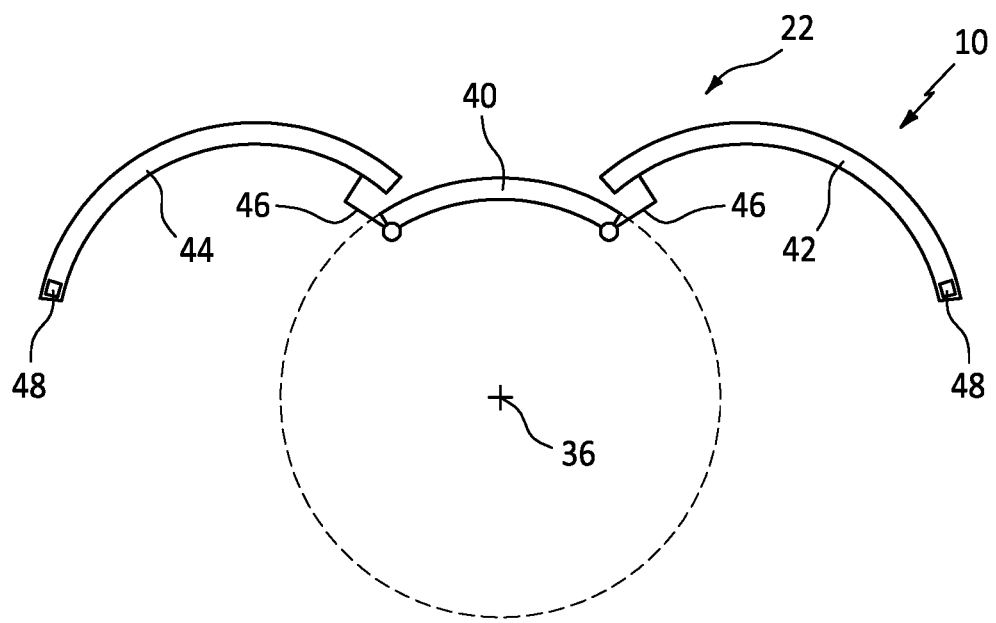
FIG. 3 illustrates a front cutaway view of portions of an aircraft propulsion assembly, in accordance with one or more embodiments of the present disclosure.

FIGS. 1-3 illustrate a propulsion assembly 10 for an aircraft. The propulsion assembly 10 of FIG. 1 includes a propulsion system 20 and a nacelle 22. The propulsion system 20 of FIG. 1 is configured as a multi-spool turbofan gas turbine engine for the aircraft propulsion assembly 10. However, while the following description and accompanying drawings may refer to the turbofan gas turbine engine propulsion assembly 10 of FIG. 1 as an example, it should be understood that aspects of the present disclosure may be equally applicable to other configurations of gas turbine engines (e.g., a turboshaft gas turbine engine, a turboprop gas turbine engine, a turbojet gas turbine engine, a propfan gas turbine engine, an open rotor gas turbine engine, etc.) as well as other types of propulsion systems (e.g., an electric-fan propulsion system, an electric-prop propulsion system, etc.). Further, aspects of the present disclosure may also be applicable to configurations of industrial equipment unrelated to aircraft propulsion such as, but not limited to, an auxiliary power unit (APU), a wind turbine, a pump, and the like.

The propulsion system 20 of FIG. 1 includes a fan section 24, a compressor section 26, a combustor section 28, and a turbine section 30. The fan section 24 drives air along a bypass flow path 32 while the compressor section 26 drives air along a core flow path 34 for compression and communication into the combustor section 28 and then expansion through the turbine section 30.

The nacelle 22 is configured to house and provide an aerodynamic cover for the propulsion system 20. The nacelle 22 extends axially along an axial centerline 36 of the propulsion assembly 10. The nacelle 22 extends circumferentially about (e.g., completely around) the axial centerline 36. The nacelle 22 of FIGS. 1-3 includes a cowl 38 (e.g., a fan cowl).

The cowl 38 of FIGS. 1-3 is disposed axially coincident with the fan section 24. The cowl 38 includes a fixed cowl portion 40, a first cowl door 42 and a second cowl door 44. Each of the first cowl door 42 and the second cowl door 44 are configured to move relative to surrounding portions of the nacelle 22 (e.g., the fixed cowl portion 40, an air inlet, a thrust reverser, etc.). Each of the first cowl door 42 and the second cowl door 44 are positionable in an open position and a closed position. As used herein, the term "closed position" will be used to refer to the first cowl door 42 and/or the second cowl door 44 in a position so as to form a portion of a substantially continuous exterior surface of the nacelle 22 (e.g., the first cowl door 42 and/or the second cowl door 44 are positioned for flight). As used herein, the term "open position" will be used to refer to the first cowl door 42 and/or the second cowl door 44 in a position other than the closed position (e.g., the first cowl door 42 and/or the second cowl door 44 are partially open, fully open, etc.). In the open position, each of the first cowl door 42 and the second cowl door 44 are configured to allow access (e.g., for maintenance) to internal components of the propulsion assembly 10, for example, components of the propulsion system 20. Each of the first cowl door 42 and the second cowl door 44 includes one or more hinges 46 and at least one latch assembly 48. The cowl 38 of FIG. 2 is illustrated with three latch assemblies 48, however, the present disclosure is not limited to any particular number of the latch assembly 48 for securing the first cowl door 42 and the second cowl door 44.

The hinges 46 of FIGS. 2 and 3 are configured for rotatably mounting the first cowl door 42 and the second cowl door 44 to the cowl 38 to the fixed cowl portion 40. The hinges 46 may be configured, for example, as gooseneck hinges, however, the present disclosure is not limited to any particular configuration of the hinges 46.

The latch assembly 48 is configured to secure the first cowl door 42 and/or the second cowl door 44 in the closed position. The latch assemblies 48 of FIGS. 2 and 3 are disposed on and/or inside of each of the first cowl door 42 and the second cowl door 44 such that the first cowl door 42 and the second cowl door 44 are fixedly secured to one another in the closed position by the latch assembly 48, as will be discussed in further detail. However, the latch assemblies 48 of the present disclosure are not limited to the particular latch assembly 48 configuration shown in FIGS. 2 and 3. For example, the latch assemblies 48 may alternatively be used to fixedly secure the first cowl door 42 and/or the second cowl door 44 to another portion (e.g., a fixed portion) of the nacelle 22. While the latch assembly 48 of the present disclosure will be explained with reference to the first cowl door 42 and the second cowl door 44 of an aircraft nacelle, it should be understood that the latch assembly 48 of the present disclosure is also applicable to other configurations of cowl doors (e.g., thrust reverser cowl doors, core cowl doors, etc.), moveable enclosures, access panels, and the like.

Figure 4:
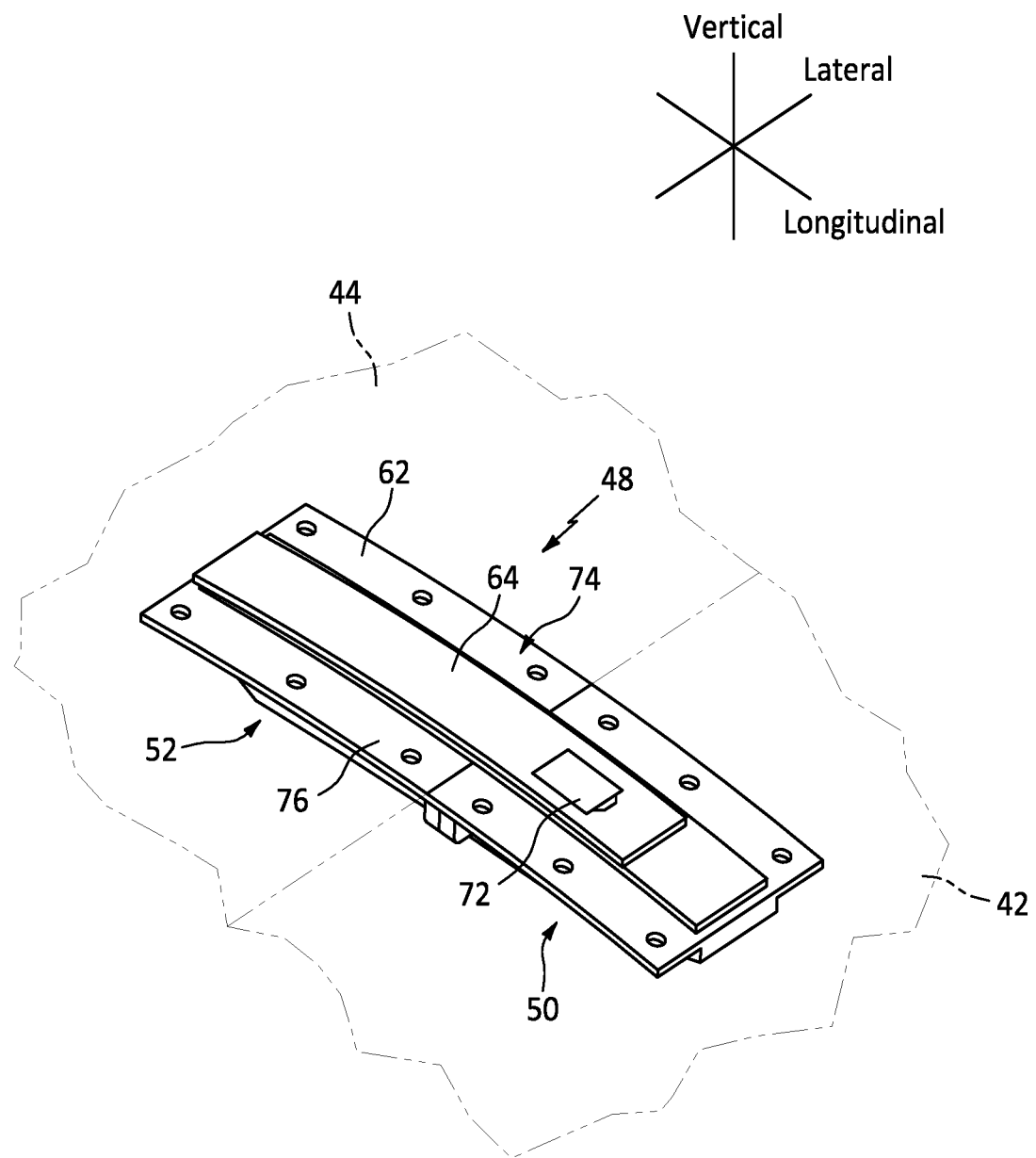
FIG. 4 illustrates a perspective cutaway view of portions of nacelle cowl doors including a latch assembly, in accordance with one or more embodiments of the present disclosure.

FIG. 4 illustrates a cutaway view of the latch assembly 48 relative to the first cowl door 42 and the second cowl door 44. The latch assembly 48 of FIG. 4 includes a first latch portion 50 and a second latch portion 52. The first latch portion 50 is mounted to the first cowl door 42. The second latch portion 52 is mounted to the second cowl door 44. With the first cowl door 42 and the second cowl door 44 in the closed position, the first latch portion 50 is positioned circumferentially adjacent the second latch portion 52. FIG. 4 illustrates the latch assembly 48 in an engaged condition in which the first latch portion 50 is engaged with the second latch portion 52 to fixedly secure the first cowl door 42 and the second cowl door 44 in the closed position. As used herein, the term "engaged condition" with respect to the latch assembly 48 is used to indicate that the latch assembly 48 is in a final condition for securing the first cowl door 42 and the second cowl door 44 in the closed position for flight. As used herein, the term "disengaged condition" will be used to refer to the latch assembly 48 in a condition other than the engaged condition.

Figure 5:
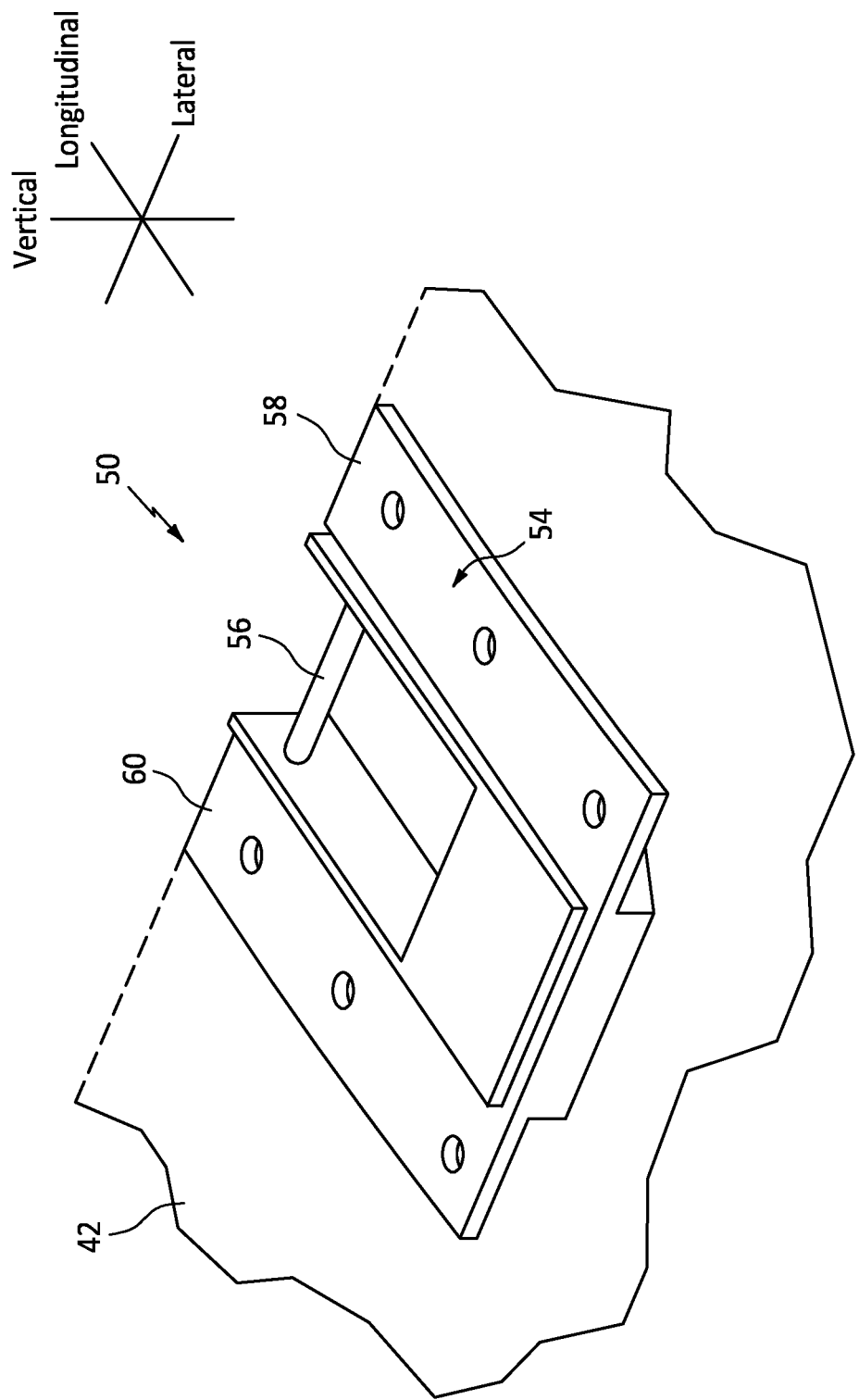
FIG. 5 illustrates a perspective view of a portion of the latch assembly of FIG. 4, in accordance with one or more embodiments of the present disclosure.

FIG. 5 illustrates a perspective view of the first latch portion 50. The first latch portion 50 includes a housing 54 and a keeper 56. The housing 54 is mounted to or otherwise formed by the first cowl door 42. For example, the housing 54 may be mounted to the first cowl door 42 by one or more fasteners (not shown). The housing 54 includes a first lateral portion 58 and a second lateral portion 60. The first lateral portion 58 is laterally spaced from the second lateral portion 60. The keeper 56 is fixedly mounted to the housing 54. The keeper 56 extends between (e.g., laterally between) and is mounted to the first lateral portion 58 and the second lateral portion 60 The keeper 56 is configured to securely mate with the second latch portion 52 with the latch assembly 48 in the engaged condition. The keeper 56 of FIG. 5 is configured as a cylindrical body. However, the present disclosure is not limited to any particular configuration of the keeper 56 so long as keeper 56 is configured to securely mate with the second latch portion 52 with the latch assembly 48 in the engaged condition. The terms "lateral," "longitudinal," and "vertical" are used herein to describe the orientations of latch assembly 48 components relative to one another, and should not be considered otherwise limiting.

Figure 6:
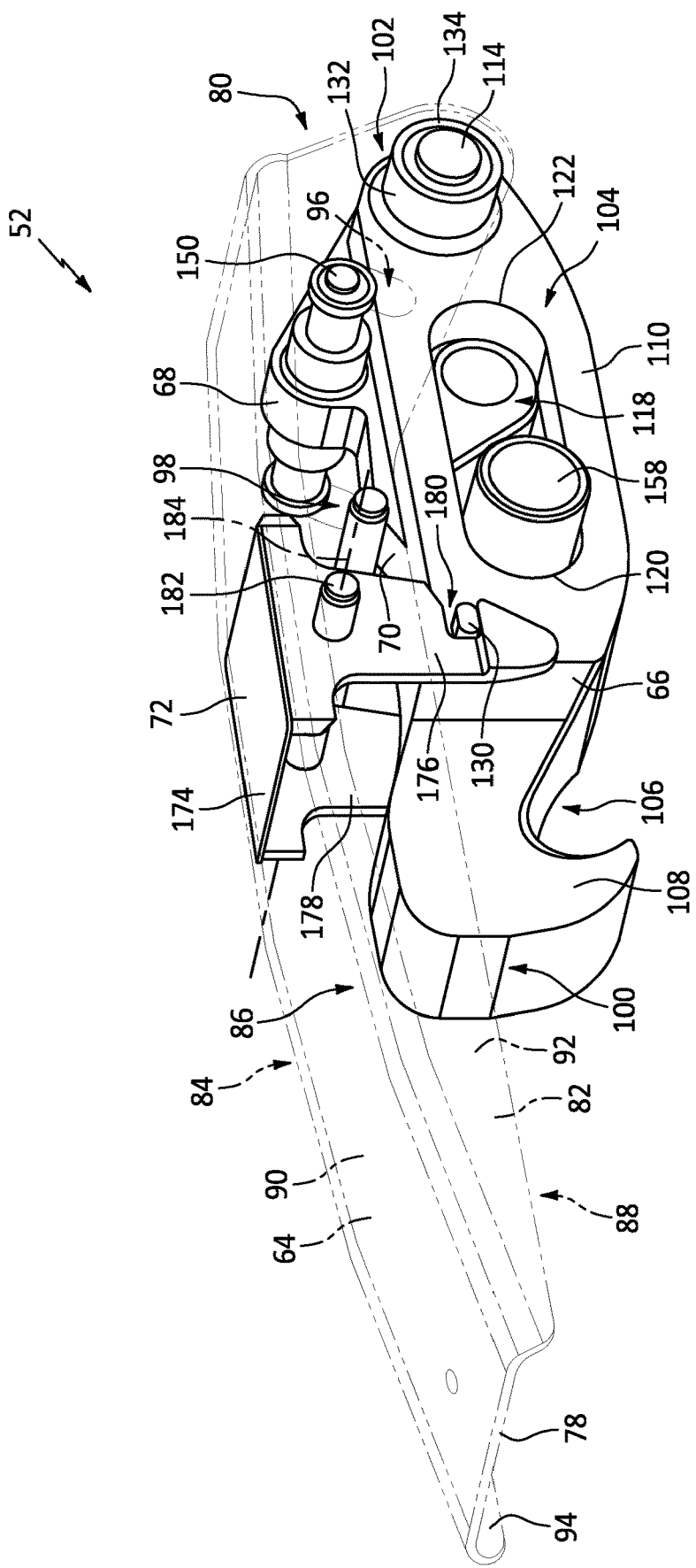
FIG. 6 illustrates a perspective view of a portion of a latch assembly in an engaged condition, in accordance with one or more embodiments of the present disclosure.

FIGS. 4 and 6 illustrate the second latch portion 52. The second latch portion 52 includes a housing 62, a handle 64, a hook 66, a first link 68, a second link 70, and a latch release member 72.

The housing 62 is mounted to or otherwise formed by the second cowl door 44. For example, the housing 62 may be mounted to the second cowl door 44 by one or more fasteners (not shown). The housing 62 includes a first lateral portion 74 and a second lateral portion 76. The first lateral portion 74 is laterally spaced from the second lateral portion 76.

The handle 64 is disposed between (e.g., laterally between) the first lateral portion 74 and the second lateral portion 76. The handle 64 extends longitudinally between and to a first longitudinal end 78 of the handle 64 and a second longitudinal end 80 of the handle 64. The handle 64 extends laterally between and to a first lateral end 82 of the handle 64 and a second lateral end 84 of the handle 64. The handle 64 extends vertically between and to a first vertical end 86 of the handle 64 and a second vertical end 88 of the handle 64. The handle 64 includes an exterior portion 90, a first lateral portion 92, and a second lateral portion 94. The exterior portion 90 extends from the first longitudinal end 78 to the second longitudinal end 80 at (e.g., on, adjacent, or proximate) the first vertical end 86. The exterior portion 90 further extends between and to the first lateral end 82 and the second lateral end 84. With the latch assembly 48 in the engaged condition, the exterior portion 90 may form a portion of an exterior of the cowl 38 (see FIGS. 2 and 3). The first lateral portion 92 extends from the exterior portion 90 at (e.g., on, adjacent, or proximate) the first lateral end 82. The first lateral portion 92 further extends between and to the first vertical end 86 and the second vertical end 88. The second lateral portion 94 extends from the exterior portion 90 at (e.g., on, adjacent, or proximate) the second lateral end 84. The second lateral portion 94 further extends between and to the first vertical end 86 and the second vertical end 88. The first lateral portion 92 is spaced (e.g., laterally spaced) from the second lateral portion 94. The first lateral portion 92 forms a first elongated slot 96 laterally through the first lateral portion 92. The second lateral portion 94 forms a second elongated slot 98 laterally through the second lateral portion 94.

Figure 7:
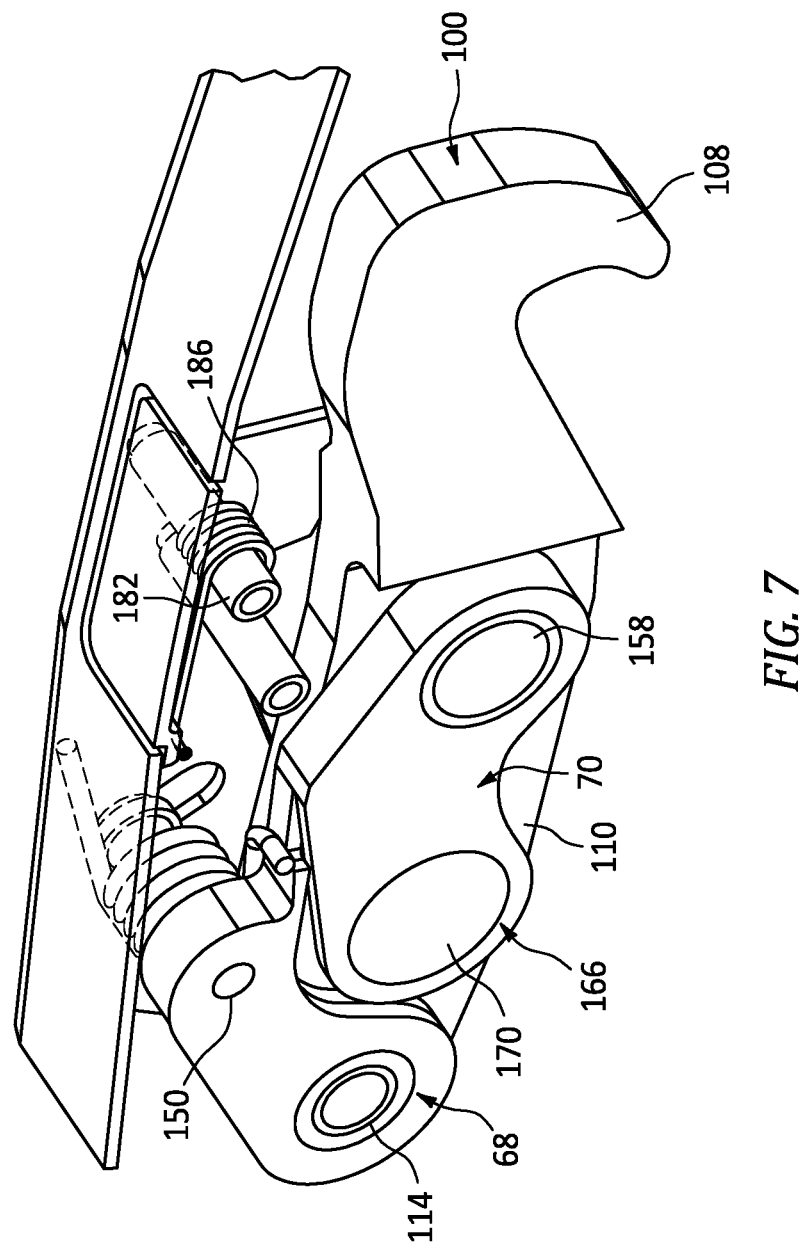
FIG. 7 illustrates a perspective cutaway view of a portion of the latch assembly of FIG. 6 in an engaged condition, in accordance with one or more embodiments of the present disclosure.
Figure 8:
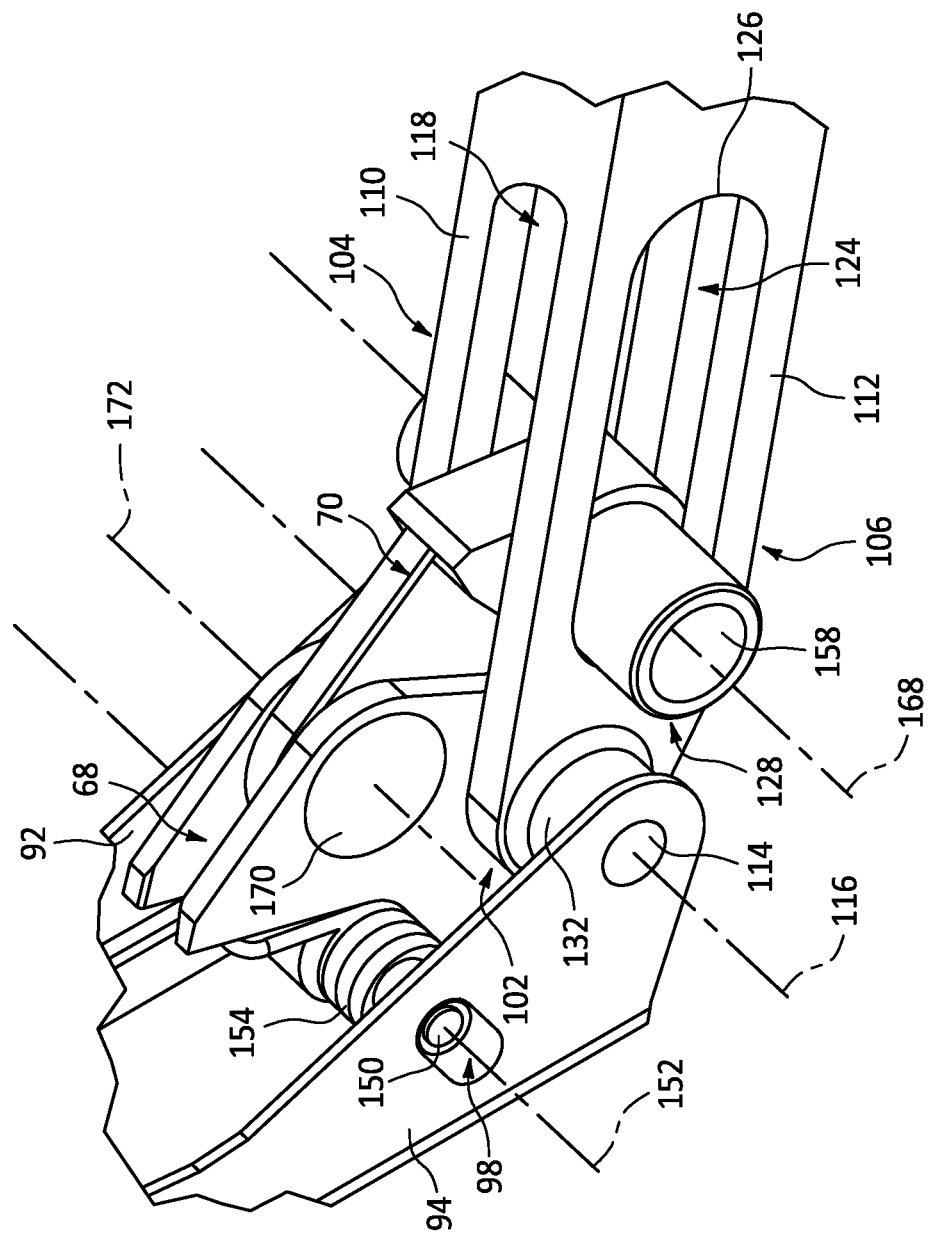
FIG. 8 illustrates a perspective view of a portion of the latch assembly of FIG. 6 in a disengaged condition, in accordance with one or more embodiments of the present disclosure.

FIGS. 6-8 illustrate portions of the second latch portion 52 including the hook 66. FIGS. 6 and 7 illustrate the second latch portion 52 in the engaged condition of the latch assembly 48. FIG. 8 illustrates the second latch portion 52 in the disengaged condition of the latch assembly 48. The hook 66 extends between and to a first longitudinal end 100 of the hook 66 and a second longitudinal end 102 of the hook 66. The hook 66 further extends between and to a first lateral end 104 of the hook 66 and a second lateral end 106 of the hook 66. The hook 66 includes a hook portion 108, a first lateral portion 110, and a second lateral portion 112. The hook portion 108 is disposed at (e.g., on, adjacent, or proximate) the first longitudinal end 100. The hook portion 108 is configured to securely mate with the keeper 56 (see FIG. 5) with the latch assembly 48 in the engaged condition. The first lateral portion 110 extends between and to the hook portion 108 and the second longitudinal end 102 at (e.g., on, adjacent, or proximate) the first lateral end 104. The second lateral portion 112 extends between and to the hook portion 108 and the second longitudinal end 102 at (e.g., on, adjacent, or proximate) the second lateral end 106. The first lateral portion 110 is spaced (e.g., laterally spaced) from the second lateral portion 112. The first lateral portion 110 and the second lateral portion 112 are rotatably mounted to the first lateral portion 92 and the second lateral portion 94 at (e.g., on, adjacent, or proximate) the second longitudinal end 102. For example, the first lateral portion 110 and the second lateral portion 112 may be mounted to the first lateral portion 92 and the second lateral portion 94 by a pin 114 which extends (e.g., laterally extends) along a rotational axis 116, such that the handle 64 may rotate about the rotational axis 116 relative to the hook 66. The rotational axis 116 may be disposed at (e.g., on, adjacent, or proximate) the second longitudinal end 102 and/or the second longitudinal end 80.

The first lateral portion 110 of FIGS. 6 and 8 forms a first slot 118 extending laterally through the first lateral portion 110. The first slot 118 may be a longitudinally extending slot which extends between and to a first longitudinal end 120 and a second longitudinal end 122. The second lateral portion 112 of FIGS. 6 and 8 forms a second slot 124 extending laterally through the second lateral portion 112. The second slot 124 may be a longitudinally extending slot which extends between and to a first longitudinal end 126 and a second longitudinal end 128.

Each of the first lateral portion 110 and the second lateral portion 112 may include a projection 130 (shown for the first lateral portion 110 in FIG. 6). Each projection 130 may extend in a laterally outward direction from surrounding portions of the respective first lateral portion 110 and second lateral portion 112.

Each of the first lateral portion 110 and the second lateral portion 112 may include a tubular body 132. Each tubular body 132 may extend in a laterally outward direction (e.g., along the rotational axis 116) from surrounding portions of the respective first lateral portion 110 and second lateral portion 112 to a distal end 134. Each tubular body 132 may extend about (e.g., completely around) the pin 114. Each tubular body 132 may include one or more bushings. The distal end 134 of each tubular body 132 may be disposed in contact with or proximate the handle 64 (e.g., the first lateral portion 92 or the second lateral portion 94) and may, thereby, provide lateral support for the hook 66.

Referring to FIGS. 6-10, the first link 68 is disposed laterally between the first lateral portion 110 and the second lateral portion 112. The first link 68 includes a link body 136. The link body 136 includes a body portion 138, a first lateral portion 140, and a second lateral portion 142. Each of the first lateral portion 140 and the second lateral portion 142 extend outward from the body portion 138 (e.g., along a longitudinal-vertical plane). The first lateral portion 140 is laterally spaced from the second lateral portion 142. The body portion 138 forms a first aperture 144 extending (e.g., laterally extending) through the body portion 138. The body portion 138 forms a second aperture 146 extending (e.g., laterally extending) through the body portion 138. The first lateral portion 140 and the second lateral portion 142 form a third aperture 148 extending (e.g., laterally extending) through the first lateral portion 140 and the second lateral portion 142.

The first aperture 144 is disposed about the pin 114 such that the first link 68 is rotatable about the rotational axis 116. The first link 68 is mounted to the handle 64 by a pin 150 which extends (e.g., laterally extends) along a rotational axis 152, such that the first link 68 may rotate about the rotational axis 152 relative to the handle 64. The pin 150 extends through the second aperture 146 as well as the first elongated slot 96 and the second elongated slot 98. As shown in FIG. 8, the first link 68 may include one or more springs 154 disposed about the pin 150. The springs 154 may additionally contact portions of the link body 136 (e.g., the first lateral portion 140 and/or the second lateral portion 142) and the handle 64 (e.g., the exterior portion 90). The springs 154 may be configured to rotationally bias the handle 64 in a direction corresponding to a disengaged condition of the latch assembly 48.

The second link 70 is disposed laterally between the first lateral portion 110 and the second lateral portion 112. The second link 70 is further disposed longitudinally between the first link 68 and the hook portion 108. The second link 70 includes a link body 156 and a cylindrical body 158. The link body 156 includes a first portion 160 and a second portion 162. The first portion 160 may have a greater lateral thickness than the second portion 162. The second portion 162 is disposed laterally between the first lateral portion 140 and the second lateral portion 142. The first portion 160 forms a first aperture 164 extending (e.g., laterally extending) through the first portion 160. The second portion 162 forms a second aperture 166 extending (e.g., laterally extending) through the second portion 162.

The cylindrical body 158 extends (e.g., laterally extends) through the first aperture 164 as well as the first slot 118 and the second slot 124. The cylindrical body 158 may be mounted (e.g., fixedly mounted) to the housing 62 or second cowl door 44 (see FIG. 4), for example, by one or more fasteners (not shown). The hook 66 may be configured to move (e.g., translate) relative to the cylindrical body 158, for example, with the cylindrical body 158 positioned at (e.g., on, adjacent, or proximate) the respective first longitudinal ends 120, 126. at (e.g., on, adjacent, or proximate) the respective second longitudinal ends 122, 128, or any location therebetween. The cylindrical body 158 may extend (e.g., laterally extend) along a rotational axis 168. The second link 70 and the hook 66 may be configured to rotate about the cylindrical body 158 and the rotational axis 168. The cylindrical body 158 of FIGS. 6-8 is configured with a tubular shape, however, the present disclosure is not limited to the particular configuration of the cylindrical body 158 illustrated in FIGS. 6-8.

Figure 9:
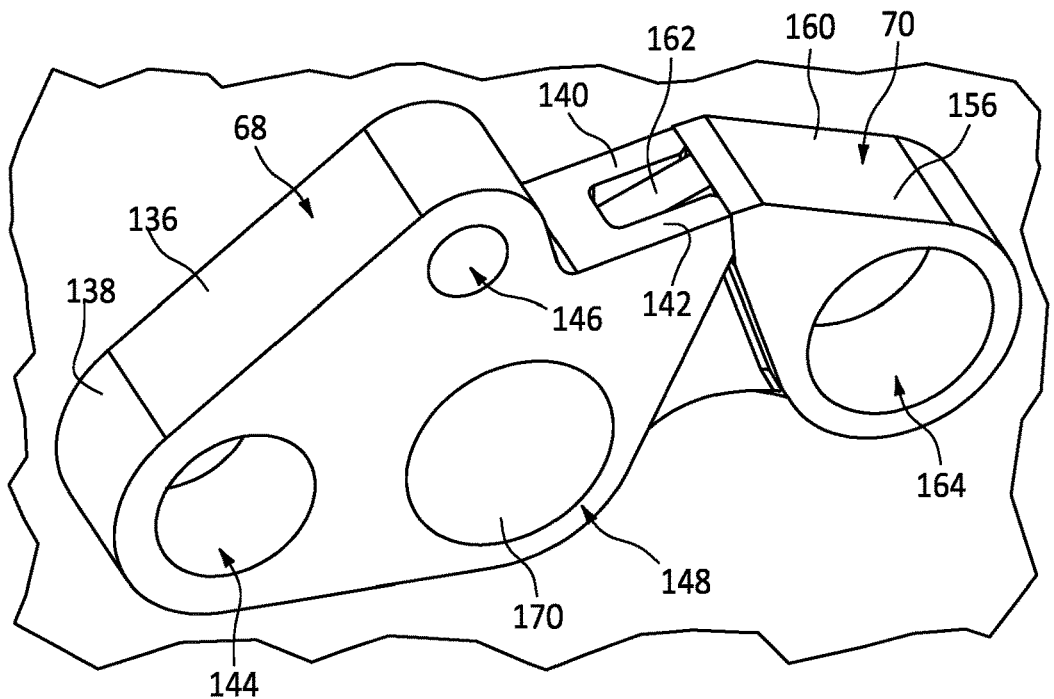
FIG. 9 illustrates a perspective view of a first link and a second link of the latch assembly of FIG. 6 in an engaged condition, in accordance with one or more embodiments of the present disclosure.
Figure 10:
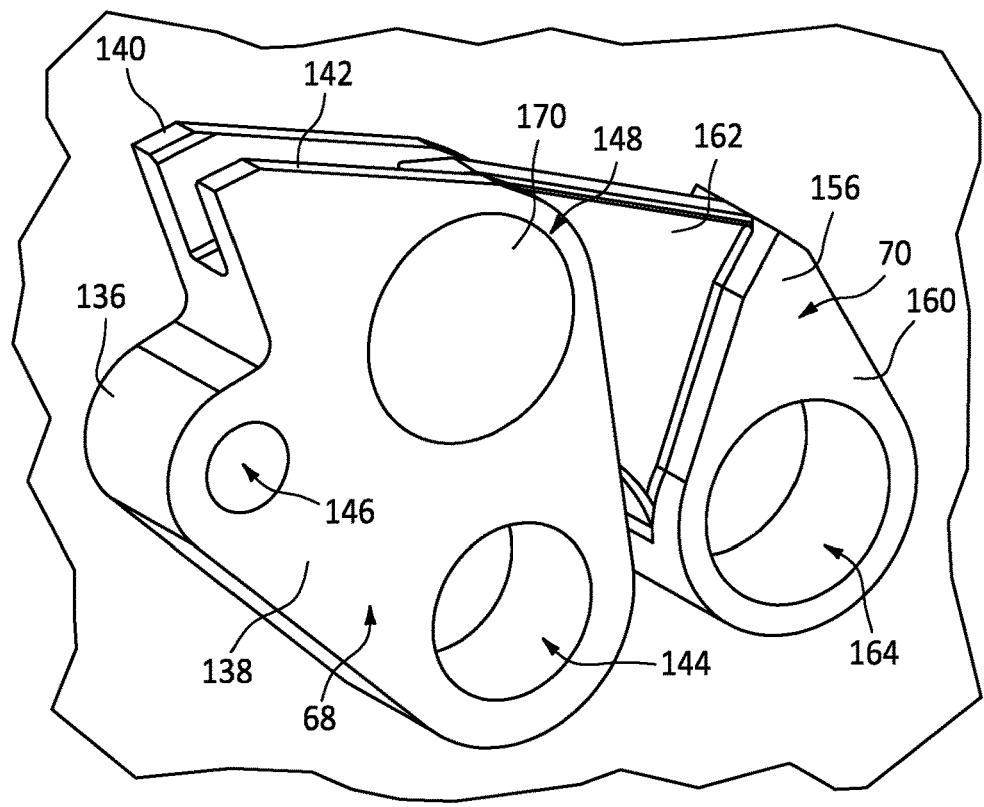
FIG. 10 illustrates a perspective view of the first link and the second link of the latch assembly of FIG. 6 in a disengaged condition, in accordance with one or more embodiments of the present disclosure.

The second link 70 is rotatably mounted to the first link 68 by a cylindrical body 170. The cylindrical body 170 extends (e.g., laterally extends) through the third aperture 148 and the second aperture 166 along a rotational axis 172. The cylindrical body 170 may be formed, for example, by a stepped rivet. The second link 70 is configured to rotate relative to the first link 68 about the cylindrical body 170 and the rotational axis 172. FIG. 9 illustrates the second link 70 in a first rotational position relative to the first link 68, which first rotational position corresponds to the engaged condition of the latch assembly 48 (see FIG. 6). FIG. 10 illustrates the second link 70 in a second rotational position relative to the first link 68, which second rotational position corresponds to the disengaged condition of the latch assembly (see FIG. 8).

The latch release member 72 includes an exterior portion 174, a first lateral portion 176, and a second lateral portion 178. The exterior portion 174 may be positioned substantially coincident with the exterior portion 90, such that the exterior portion 174 and the exterior portion 90 form a substantially continuous outer surface of the latch assembly 48. The first lateral portion 176 and the second lateral portion 178 extend inward (e.g., vertically inward) from the exterior portion 174. The first lateral portion 176 is laterally spaced from the second lateral portion 178. Each of the first lateral portion 176 and the second lateral portion 178 may form a recess 180 (shown for the first lateral portion 176 in FIG. 6).

The latch release member 72 is rotatably mounted to the handle 64. For example, the latch release member 72 may be rotatably mounted to the handle 64 by a pin 182 which extends (e.g., laterally extends) through the first lateral portion 176, the second lateral portion 178, the first lateral portion 92, and the second lateral portion 94 along a rotational axis 184. The latch release member 72 may, thereby, be configured to rotate about the rotational axis 184 between a first rotational position (e.g., a latched position) and a second rotational position (e.g., an unlatched position). In the first rotational position, the first lateral portion 176 and the second lateral portion 178 may be engaged with the projections 130. For example, the projections 130 may be disposed within the recesses 180. In this first rotational position, the handle 64 may be substantially fixed in position relative to the hook 66 by the latch release member 72. With the latch assembly 48 in the engaged condition, the latch release member 72 may be engaged with the projections 130. In the second rotational position, the first lateral portion 176 and the second lateral portion 178 may be disengaged from the projections 130. In this second rotational position, the handle 64 may be rotated away from the hook 66 to position the latch assembly 48 in the disengaged condition. The latch release member 72 may include a spring 186 disposed about the pin 182. The spring 186 may be configured to rotationally bias the latch release member 72 in the first rotational position.

The location of the first link 68 and the second link 70 laterally within the hook 66 may form a fully-constrained load path which, in turn, may facilitate improved structural support for the components of the latch assembly 48 with the latch assembly 48 in the engaged condition (e.g., an ultimate tension condition of the latch assembly 48). Moreover, the two-link configuration of the latch assembly 48 of the present disclosure may facilitate a reduction in latch assembly 48 components in comparison to conventional latch assemblies.

It is noted that various connections are set forth between elements in the preceding description and in the drawings. It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities. It is further noted that various method or process steps for embodiments of the present disclosure are described in the following description and drawings. The description may present the method and/or process steps as a particular sequence. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the description should not be construed as a limitation.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various aspects of the present disclosure have been disclosed, it will be apparent to those of ordinary skill in the art that many more embodiments and implementations are possible within the scope of the present disclosure. For example, the present disclosure as described herein includes several aspects and embodiments that include particular features. Although these particular features may be described individually, it is within the scope of the present disclosure that some or all of these features may be combined with any one of the aspects and remain within the scope of the present disclosure. References to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Accordingly, the present disclosure is not to be restricted except in light of the attached claims and their equivalents.

What is claimed is:

1. A latch assembly comprising:
   a handle;
   a hook rotatably mounted to the handle at a first rotational axis, the hook including a hook body, the hook body including a first lateral portion and a second lateral portion, the first lateral portion laterally spaced from the second lateral portion;
   a first link laterally between the first lateral portion and the second lateral portion, the first link rotatably mounted to the first lateral portion and the second lateral portion at the first rotational axis, and the first link is rotatably mounted to the handle at a third rotational axis; and
   a second link laterally between the first lateral portion and the second lateral portion, the second link rotatably mounted to the first link at a second rotational axis, the second link configured for translation relative to the first lateral portion and the second lateral portion;
   wherein each of the first rotational axis, the second rotational axis, and the third rotational axis is spaced from each other of the first rotational axis, the second rotational axis, and the third rotational axis.

2. The latch assembly of claim 1, wherein:
   the first lateral portion includes a first slot;
   the second lateral portion includes a second slot; and
   the second link is positioned within the first slot and the second slot.

3. The latch assembly of claim 2, wherein:
   the first slot extends longitudinally within the first lateral portion; and
   the second slot extends longitudinally within the second lateral portion.

4. The latch assembly of claim 2, wherein the second link includes a cylindrical body, the cylindrical body positioned within the first slot and the second slot.

5. The latch assembly of claim 4, wherein the hook is configured for rotation about the cylindrical body.

6. The latch assembly of claim 1, wherein the handle forms a first handle slot and a second handle slot, the first link rotatably mounted to the handle within the first handle slot and the second handle slot.

7. The latch assembly of claim 1, wherein:
   the hook body extends from a first longitudinal end to a second longitudinal end;
   the hook body further includes a hook portion at the first longitudinal end; and the first lateral portion and the second lateral portion extend from the hook portion to the second longitudinal end.

8. The latch assembly of claim 7, wherein the first rotational axis is positioned at the second longitudinal end.

9. The latch assembly of claim 1, wherein the handle includes a latch release member, the latch release member positionable in a latched position and an unlatched position, the latch release member configured to contact the first lateral portion and the second lateral portion in the latched position.

10. A latch assembly comprising:
a handle;
a hook rotatable relative to the handle about a first rotational axis, the hook including a hook body, the hook body including a first lateral portion and a second lateral portion, the first lateral portion laterally spaced from the second lateral portion;
a first link laterally between the first lateral portion and the second lateral portion, the first link rotatably mounted to the first lateral portion and the second lateral portion at the first rotational axis, and the first link is rotatably mounted to the handle at a third rotational axis; and
a second link laterally between the first lateral portion and the second lateral portion, the second link rotatably mounted to the first link at a second rotational axis, the second link including a cylindrical body, the cylindrical body extending laterally through the first lateral portion and the second lateral portion;
wherein each of the first rotational axis, the second rotational axis, and the third rotational axis is spaced from each other of the first rotational axis, the second rotational axis and the third rotational axis.

11. The latch assembly of claim 10, wherein the first lateral portion and the second lateral portion are configured to translate relative to the cylindrical body.

12. The latch assembly of claim 10, wherein:
the hook body extends from a first longitudinal end to a second longitudinal end; and
the hook body further includes a hook portion at the first longitudinal end, the first lateral portion and the second lateral portion extending from the hook portion to the second longitudinal end.

13. The latch assembly of claim 12, wherein the second link is positioned longitudinally between the first link and the hook body.

14. The latch assembly of claim 12, wherein the first rotational axis is positioned at the second longitudinal end.

15. The latch assembly of claim 10, wherein the hook is configured for rotation about the cylindrical body.

16. A latch assembly comprising:
a first latch portion including a keeper; and
a second latch portion including:
a handle;
a hook rotatably mounted to the handle at a first rotational axis, the hook including a hook body, the hook body including a hook portion, a first lateral portion, and a second lateral portion, the hook portion configured to selectively engage the keeper, the first lateral portion and the second lateral portion extending longitudinally from the hook portion, the first lateral portion laterally spaced from the second lateral portion;
a first link laterally between the first lateral portion and the second lateral portion, the first link rotatably mounted to the first lateral portion and the second lateral portion at the first rotational axis, and the first link is rotatably mounted to the handle at a third rotational axis; and
a second link laterally between the first lateral portion and the second lateral portion, the second link rotatably mounted to the first link, the second link further rotatably mounted to the first lateral portion and the second lateral portion;
wherein each of the first rotational axis, the second rotational axis, and the third rotational axis is spaced from each other of the first rotational axis, the second rotational axis, and the third rotational axis.

17. The latch assembly of claim 16, further comprising a first cowl door and a second cowl door, the first cowl door including the first latch portion and the second cowl door including the second latch portion.

18. The latch assembly of claim 16, wherein the hook body extends from a first longitudinal end to a second longitudinal end, the hook portion at the first longitudinal end, the first lateral portion and the second lateral portion extending from the hook portion to the second longitudinal end.

19. The latch assembly of claim 18, wherein the first link and the second link are longitudinally between the hook portion and the second longitudinal end.

* * * * *